US011830139B2

(12) United States Patent
Chow et al.

(10) Patent No.: US 11,830,139 B2
(45) Date of Patent: Nov. 28, 2023

(54) SYSTEMS AND METHODS FOR THREE-DIMENSIONAL VIEWING OF IMAGES FROM A TWO-DIMENSIONAL IMAGE OF A VEHICLE

(71) Applicant: Capital One Services, LLC, McLean, VA (US)

(72) Inventors: Chih-Hsiang Chow, Coppell, TX (US); Steven Dang, Plano, TX (US); Elizabeth Furlan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 78 days.

(21) Appl. No.: 17/466,920

(22) Filed: Sep. 3, 2021

(65) Prior Publication Data
US 2023/0076591 A1 Mar. 9, 2023

(51) Int. Cl.
| | |
|---|---|
| *G06T 17/20* | (2006.01) |
| *G06F 3/0484* | (2022.01) |
| *G06T 19/00* | (2011.01) |

(52) U.S. Cl.
CPC .......... *G06T 17/20* (2013.01); *G06F 3/0484* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 7,617,161 B2 * | 11/2009 | Waita | G06Q 99/00 |
| | | | 705/500 |
| 8,264,504 B2 | 9/2012 | Naimark | |
| 9,816,831 B2 * | 11/2017 | Fischer | G01C 21/3626 |
| 10,521,970 B2 * | 12/2019 | Gambaretto | G06T 15/04 |
| 11,328,483 B2 * | 5/2022 | Charvat | G06T 7/0002 |
| 2014/0104266 A1 | 4/2014 | Stone et al. | |
| 2019/0278994 A1 * | 9/2019 | Bumpas | G06N 3/045 |
| 2022/0189124 A1 * | 6/2022 | Sanor | G06F 30/27 |

FOREIGN PATENT DOCUMENTS

WO 2009/003225 A1 1/2009

\* cited by examiner

*Primary Examiner* — Saptarshi Mazumder
(74) *Attorney, Agent, or Firm* — Banner & Witcoff, Ltd.

(57) ABSTRACT

Aspects described provide systems and methods that relate generally to image analysis and, more specifically, overlaying images onto a three-dimensional model of a vehicle. The systems and methods include a vehicle application that receives vehicle information via a user interface. The vehicle application receives a plurality of images that comprise images of one or more internal components of the vehicle and images of one or more external components of the vehicle. The vehicle application utilizes a machine learning model to classify actual current images and attach, overlay, and wrap the actual current images to a three-dimensional model of the vehicle. The machine learning model and vehicle application meshes the actual current images around the three-dimensional model of the vehicle to create a three-dimensional view of the vehicle. The vehicle application further displays via the user interface the three-dimensional view of the vehicle.

20 Claims, 6 Drawing Sheets

SYSTEMS AND METHODS FOR THREE-DIMENSIONAL VIEWING OF IMAGES FROM A TWO-DIMENSIONAL IMAGE OF A VEHICLE

FIELD OF USE

Aspects of the disclosure relate generally to image analysis and, more specifically, overlaying images onto a three-dimensional model of a vehicle.

BACKGROUND

Before buying a vehicle, consumers do a lot of research to determine whether or not they are interested to physically go to the dealership and review the car or take it for a test drive. While viewing and shopping for a vehicle, there are many elements the consumer can review online, such as two-dimensional images of the specific vehicle. However, one critical aspect not shown online, is depth perception. Two-dimensional images do not give a consumer a good feel for the depth of an area because of the limitations of a two-dimensional images, for example, how much legroom there is for the backseat or what is the space like between the pedals and the driver seat. Aspects described herein may address these and other problems, and generally improve how consumers can view vehicle three-dimensional images when buying a vehicle.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Some aspects described herein may provide a computing device comprising: a display with a user interface; one or more processors; and memory storing instructions. The memory storing instructions that, when executed by the one or more processors, may cause the computing device to: receive, via the user interface from a user, vehicle information that includes at least one of a vehicle make, a vehicle model, or a vehicle year; receive a plurality of images comprising images of one or more internal components of the vehicle and images of one or more external components of the vehicle; receive, by the one or more processors, a three-dimensional model of the vehicle based on the vehicle information; train, by the one or more processors, a machine learning model for overlaying the plurality of images on the three-dimensional model of the vehicle based on the plurality of images and the vehicle information; and display, via the user interface, the three-dimensional view of the vehicle. The three-dimensional model may comprise the one or more internal components of the vehicle and the one or more external components of the vehicle. The machine learning model may analyze the plurality of images. The machine learning model may also identify a plurality of anchor points on the three-dimensional model of the vehicle and the plurality of images. The machine learning model may match the plurality of anchor points on the three-dimensional model to the plurality of anchor points on the plurality of images. Lastly, the machine learning model may overlay the plurality of images on the three-dimensional model to create a three-dimensional view of the vehicle. The trained machine learning model may be configured to determine a pattern of the plurality of anchor points on the three-dimensional model of the vehicle associated with the plurality of anchor points on the plurality of images that indicates a potential correlation between the plurality of anchor points on the three-dimensional model and the plurality of anchor points on the plurality of images.

According to some embodiments, the computing device may further include a camera, wherein the instructions, when executed by the one or more processors, cause the computing device to: cause, responsive to a user selection on the user interface, the camera to capture the plurality of images, wherein the plurality of images comprises images of one or more internal components of the vehicle and images of one or more external components of the vehicle; and receive, via the camera, the plurality of images of the vehicle. Additionally, the computing device may prompt, via the user interface, the user to capture additional images, using the camera, of the vehicle based on a request for missing information. Further, when the user selects a component on the three-dimensional view of the vehicle, the computing device may display, via the user interface, one or more of the plurality of images for the component on the vehicle. Additionally, when the user selects a location on the three-dimensional view of the vehicle, the computing device may display, via the user interface, one or more of the plurality of images for the location on the vehicle. The plurality of images may comprise images at different angles of the one or more internal components of the vehicle and the one or more external components of the vehicle. The plurality of anchor points may comprise a set of corners and a set of edges from the three-dimensional model of the vehicle and the plurality of images. The plurality of anchor points may be defined as a set of points on the three-dimensional model of the vehicle and the plurality of images where an X/Y grid difference for the set of points is greater than a threshold amount. Further, the overlaying the plurality of images on the three-dimensional model of the vehicle may create a mesh of the plurality of images to create the three-dimensional view of the vehicle. The plurality of anchor points on the three-dimensional model may correlate to the one or more internal components and the one or more external components of the three-dimensional model. The plurality of anchor points on the plurality of images may correlate to the one or more internal components and the one or more external components of the plurality of images.

Additionally, a variety of aspects described herein provide a computer-implemented method comprising: displaying, on a display of a computing device with one or more processors, a user interface; prompting, via the user interface, a user to enter vehicle information; receiving, via the user interface from the user, the vehicle information about a vehicle that includes at least one of a vehicle make, a vehicle model, or a vehicle year; receiving a plurality of images comprising images of one or more internal components of the vehicle and images of one or more external components of the vehicle; receiving, by the one or more processors, a three-dimensional model of the vehicle based on the vehicle information; training, by the one or more processors, a convolutional neural network (CNN) model for overlaying the plurality of images on the three-dimensional model of the vehicle based on the plurality of images and the vehicle information; and displaying, via the user interface, the three-dimensional view of the vehicle.

The three-dimensional model may comprise the one or more internal components of the vehicle and the one or more external components of the vehicle. The CNN model may analyze the plurality of images. The CNN model may identify a plurality of anchor points on the three-dimensional model of the vehicle and the plurality of images. The plurality of anchor points on the three-dimensional model may correlate to the one or more internal components and the one or more external components of the three-dimensional model. The plurality of anchor points on the plurality of images may correlate to the one or more internal components and the one or more external components of the plurality of images. The CNN model may match the plurality of anchor points on the three-dimensional model to the plurality of anchor points on the plurality of images. The CNN model and one or more processors may overlay the plurality of images on the three-dimensional model to create a three-dimensional view of the vehicle. The CNN model may be configured to determine a pattern of the plurality of anchor points on the three-dimensional model of the vehicle associated with the plurality of anchor points on the plurality of images that indicates a potential correlation between the plurality of anchor points on the three-dimensional model and the plurality of anchor points on the plurality of images.

Additionally, a variety of aspects described herein may provide one or more non-transitory media storing instructions that, when executed by one or more processors, may cause a computing device to perform steps comprising: displaying, on a display of the computing device, a user interface; prompting, via the user interface, a user to enter vehicle information about a vehicle; receiving, via the user interface, the vehicle information including a vehicle make, a vehicle model, and a vehicle year; receiving a plurality of images comprising images of one or more internal components of the vehicle and images of one or more external components of the vehicle; receiving, by the one or more processors, a three-dimensional model of the vehicle based on the vehicle information; training, by the one or more processors, a convolutional neural network (CNN) model for overlaying the plurality of images on the three-dimensional model of the vehicle based on the plurality of images and the vehicle information; displaying, via the user interface, the three-dimensional view of the vehicle; when the user selects a component on the three-dimensional view of the vehicle, displaying, via the user interface, one or more of the plurality of images for the component on the vehicle; and when the user selects a location on the three-dimensional view of the vehicle, displaying, via the user interface, one or more of the plurality of images for the location on the vehicle. The three-dimensional model may comprise the one or more internal components of the vehicle and the one or more external components of the vehicle. The CNN model may analyze the plurality of images. The CNN model may identify a plurality of anchor points on the three-dimensional model of the vehicle and the plurality of images. The plurality of anchor points on the three-dimensional model may correlate to the one or more internal components and the one or more external components of the three-dimensional model. The plurality of anchor points on the plurality of images may correlate to the one or more internal components and the one or more external components of the plurality of images. The plurality of anchor points may be defined by one or more of the following: a set of corners and a set of edges from the three-dimensional model of the vehicle and the plurality of images or a set of points on the three-dimensional model of the vehicle and the plurality of images where an X/Y grid difference for the set of points is greater than a threshold amount. The CNN model may match the plurality of anchor points on the three-dimensional model to the plurality of anchor points on the plurality of images. The CNN model may overlay the plurality of images on the three-dimensional model to create a three-dimensional view of the vehicle. The CNN model may be configured to determine a pattern of the plurality of anchor points on the three-dimensional model of the vehicle associated with the plurality of anchor points on the plurality of images that indicates a potential correlation between the plurality of anchor points on the three-dimensional model and the plurality of anchor points on the plurality of images.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
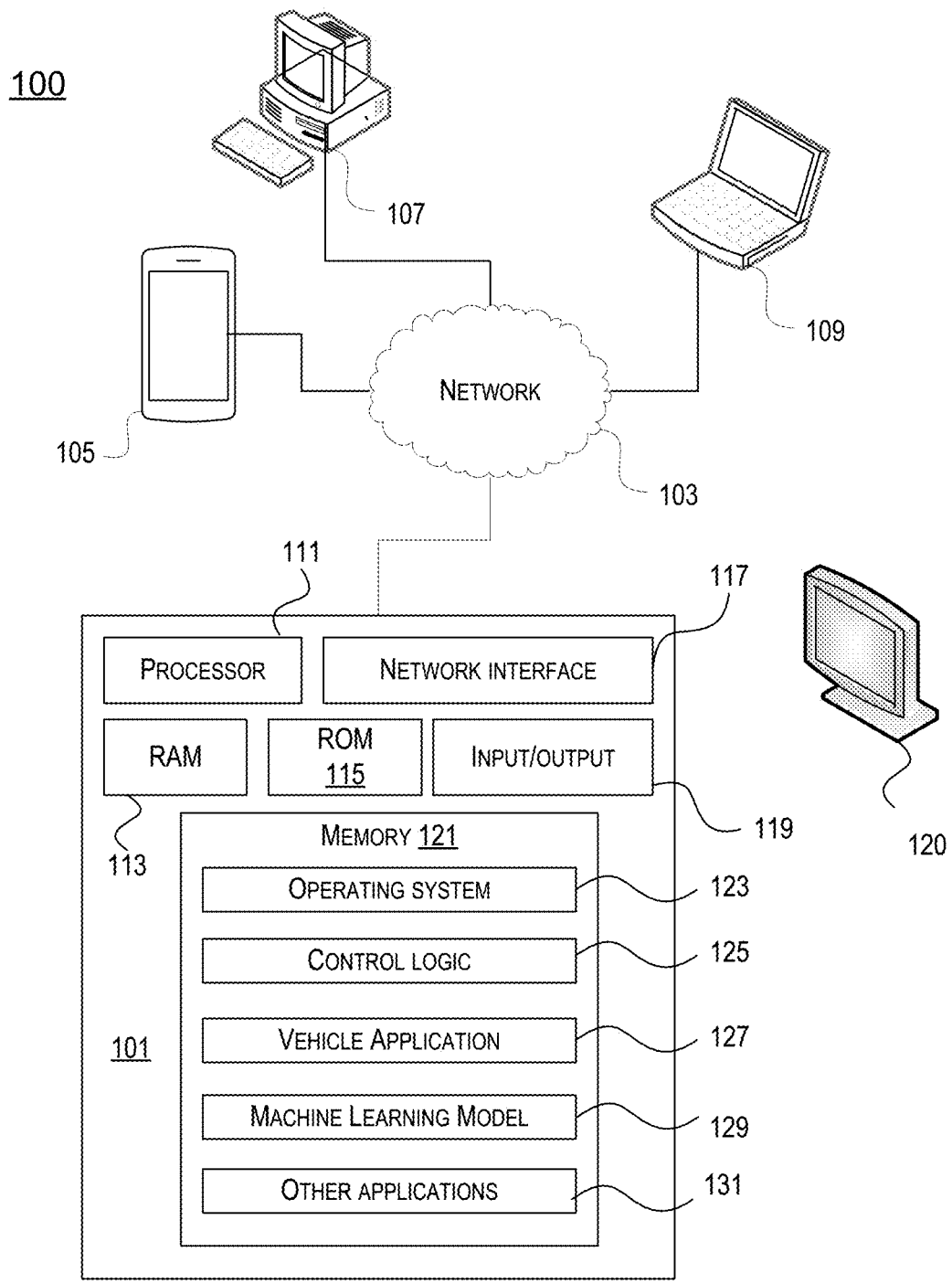
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described provide systems and methods that relate generally to image analysis and, more specifically, overlaying images onto a three-dimensional model of a vehicle. The systems and methods include a vehicle application that receives vehicle information via a user interface. The vehicle application receives a plurality of images that comprise images of one or more internal components of the vehicle and images of one or more external components of the vehicle. The vehicle application utilizes a machine learning model to attach, overlay, and wrap the actual current images to a three-dimensional model of the vehicle. The machine learning model and vehicle application meshes the actual current images around the three-dimensional model of the vehicle to create a three-dimensional view of the vehicle. The vehicle application further displays via the user interface the three-dimensional view of the vehicle.

Aspects discussed herein may relate to a vehicle application operating on a vehicle dealership server to help potential vehicle buyers view specific vehicles for sale at the dealership. The vehicle application can provide consumers a better understanding of the depth perception of a vehicle and the vehicle components using current images and merging this information with three-dimensional models of the target vehicle. The vehicle dealership server may include a database of three-dimensional models for vehicles that would have the exterior and interior built out so that the dimensions match a real vehicle. Whenever a dealership uploads images for a vehicle, the consumers may be given the option to link the current images with a certain perspective of the three-dimensional vehicle, whether it would be the interior or exterior of the vehicle.

The images may then be attached, overlaid, and wrapped onto the three-dimensional model to create a three-dimensional view via a machine learning model, so that if the consumer were looking at the three-dimension view, the consumer would see the actual current image wrapped over the elements of the three-dimensional model. The wrapping of images over the elements of the three-dimensional model, may be completed for all the actual current images that the dealership possesses in order that the vehicle could potentially have all angles of the three-dimensional view linked to a real image.

The consumer, when browsing the vehicle online may click on the vehicle and view the three-dimensional view of the vehicle from the exterior or the interior. As the consumer rotates the view around, the consumer may be able to view the various actual current images that were overlaid on the three-dimensional model. If the consumer double clicks or selects on a specific section of the three-dimensional view of the vehicle, the two-dimensional actual current image may display a pop-up view allowing the consumer to inspect the actual current image. This pop-up view may give the consumer the ability to scrutinize the original images with the additional information that a three-dimensional model could provide. The three-dimensional view may give the consumer the flexibility to see how all the images come together for the complete vehicle. The three-dimensional view may also give the consumer a way to determine which sections are missing two-dimensional actual current images so that the consumer can request additional images of a certain angle so the consumer knows what to inspect when the consumer is at the dealership.

The vehicle application may utilize a machine learning model to attach, overlay, and wrap the actual current images to the three-dimensional models and mesh the actual current images around the three-dimensional model. The machine learning model may be one or more of a machine classifier, an image classifier, and/or a machine learning algorithm. The machine learning model may utilize image processing to mesh the image around the three-dimensional model of the vehicle. The machine learning model may be a neural network model or a CNN machine learning model.

Before discussing these concepts in greater detail, however, several examples of a computing device that may be used in implementing and/or otherwise providing various aspects of the disclosure will first be discussed with respect to FIG. 1.

FIG. 1 illustrates one example of a vehicle dealership server 101 as a computing device that may be used to implement one or more illustrative aspects discussed herein. For example, the vehicle dealership server 101 may, in some embodiments, implement one or more aspects of the disclosure by reading and/or executing instructions and performing one or more actions based on the instructions. In some embodiments, the vehicle dealership server 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The vehicle dealership server 101 may, in some embodiments, operate in a standalone environment. In a variety of embodiments, the vehicle dealership server 101 may operate in a networked environment. As shown in FIG. 1, various devices 101, 105, 107, and 109 may be interconnected as network nodes via a network 103, such as the Internet. Other networks may also or alternatively be used, including private intranets, corporate networks, LANs, wireless networks, personal networks, and the like. Network 103 is for illustration purposes and may be replaced with fewer or additional computer networks. A local area network (LAN) may have one or more of any known network topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, the vehicle dealership server 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring the vehicle dealership server 101 into a special purpose computing device in order to perform one or more of the various functions discussed herein. Memory 121 may store operating system software 123 for controlling overall operation of the vehicle dealership server 101, control logic 125 for instructing the vehicle dealership server 101 to perform aspects discussed herein, a vehicle application 127, a machine learning model 129, and other applications 131. The machine learning model 129 may be a machine classifier, an image classifier, and/or a machine learning algorithm. Control logic 125 may be incorporated in and may be a part of one or more of the vehicle application 127 and/or the machine learning model 129. In several embodiments, the vehicle dealership server 101 may include two or more of any and/or all of these components (e.g., two or more processors, two or more memories, etc.) and/or other components and/or subsystems not illustrated here.

Devices 105, 107, 109 may have similar or different architecture as described with respect to the vehicle dealership server 101. Those of skill in the art will appreciate that the functionality of the vehicle dealership server 101 (or device 105, 107, 109) as described herein may be spread across multiple data processing devices, for example, to distribute processing load across multiple computers, to segregate transactions based on geographic location, user access level, quality of service (QoS), etc. For example, the vehicle dealership server 101 and devices 105, 107, 109, and others may operate in concert to provide parallel computing features in support of the operation of control logic 125 and/or the vehicle application 127 or the machine learning model 129.

Figure 2:
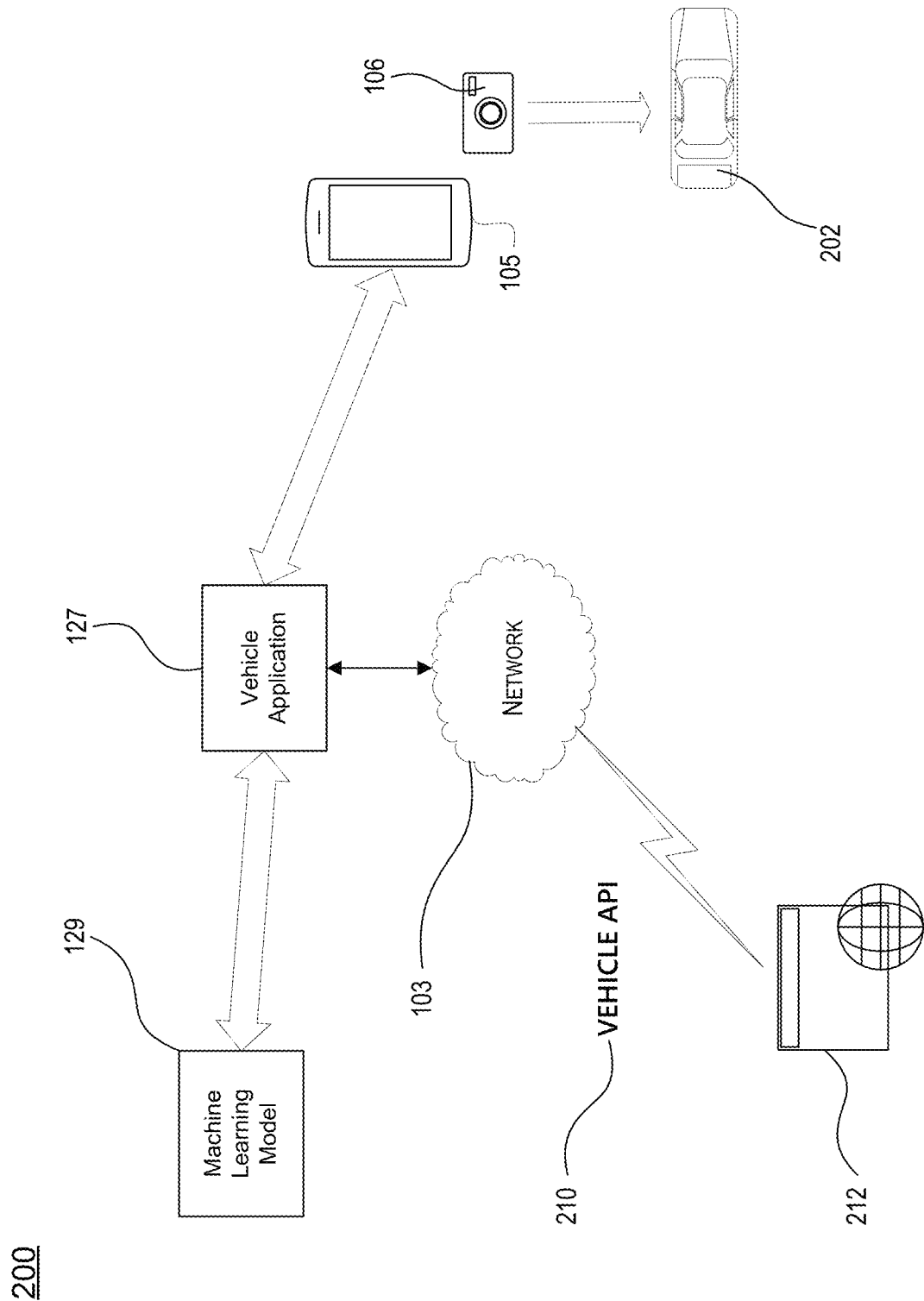
FIG. 2 depicts an example system with a vehicle application that may be used in implementing one or more aspects of the disclosure in accordance with one or more illustrative aspects discussed herein.

FIG. 2 illustrates an exemplary system 200 system with a vehicle application 127, machine learning model 129, and device 105 from FIG. 1. The vehicle application 127 and device 105 may, in some embodiments, operate in a stand-alone environment. In many embodiments, the vehicle application 127 and device 105 may operate in a networked environment. As shown in FIG. 2, the vehicle application 127 and device 105 may be interconnected as network nodes via a network 103, such as the Internet. Other networks may also or alternatively be used, including private intranets, corporate networks, LANs, wireless networks, personal networks, and the like. Network 103 is for illustration purposes and may be replaced with fewer or additional computer networks. A local area network (LAN) may have one or more of any known network topologies and may use one or more of a variety of different protocols, such as Ethernet. The vehicle application 127 and device 105 may be connected to one or more of the networks 103 via twisted pair wires, coaxial cable, fiber optics, radio waves or other communication media.

As illustrated in FIG. 2, a device 105 may comprise one or more processors, storage, and a vehicle application 127 that are configured to execute a machine learning model 129. The device 105 may be one of various devices such as a desktop computer, a computer server, a mobile device (e.g., a laptop computer, a tablet computer, a smart phone, any other types of mobile computing devices, and the like), and/or any other type of data processing device. The device 105 may include a display with a user interface. Additionally, the device 105 may include one or more image capture devices or cameras 106 and storage to store images or videos from the one or more cameras 106. The images from cameras 106 may be processed by the vehicle application 127 or the vehicle valuation server 101. The image capture devices may comprise still image cameras, video cameras, or a combination of still image cameras and video cameras. The camera 106 may be capable of capturing still images or pictures, capturing videos, or a combination of still images or pictures and videos of a vehicle 202 and/or components within the vehicle 202.

The vehicle application 127 may utilize a machine learning model 129 for image processing and classifying to attach, overlay, and wrap actual and current two-dimensional images to a three-dimensional model of a vehicle and meshing the actual current images around the three-dimensional model. The machine learning model 129 may provide data munging, parsing, and machine learning algorithms for attaching, overlaying, and wrapping actual current images to the three-dimensional model of the vehicle. The machine learning model 129 may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs.

As further illustrated in FIG. 2, the vehicle application 127 may utilize and be connected via the network 103 to one or more application programming interfaces (APIs). The vehicle application 127 may include and execute a vehicle API 210 that is connected to one or more vehicle websites 212 via the network 103. The vehicle API 210 connected to one or more vehicle websites 212 may provide three-dimensional models of vehicles for the vehicle application 127. The vehicle API 210 may be a computing interface that defines interactions between multiple software intermediaries, such as the one or more vehicle websites 212. The vehicle API 210 may define calls and requests that can be made to the one or more vehicle websites 212, how to make the calls and requests, the data formats that should be utilized for the calls and requests, and the conventions to follow for the calls and requests. The vehicle API 210 may communicate with various APIs as part of the one or more vehicle websites 212.

Figure 3A:
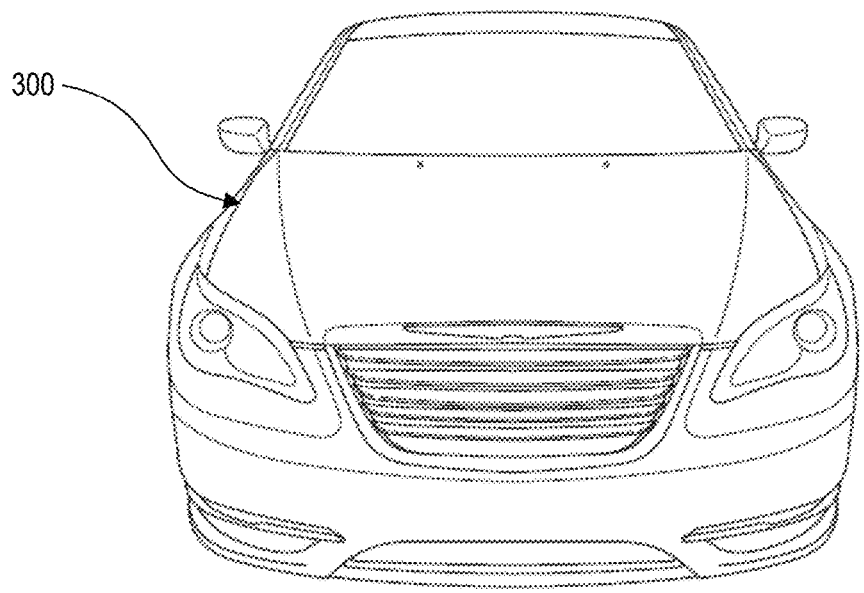
FIGS. 3A and 3B depict an exemplary exterior vehicle image with anchor points in accordance with one or more illustrative aspects discussed herein.
Figure 3B:
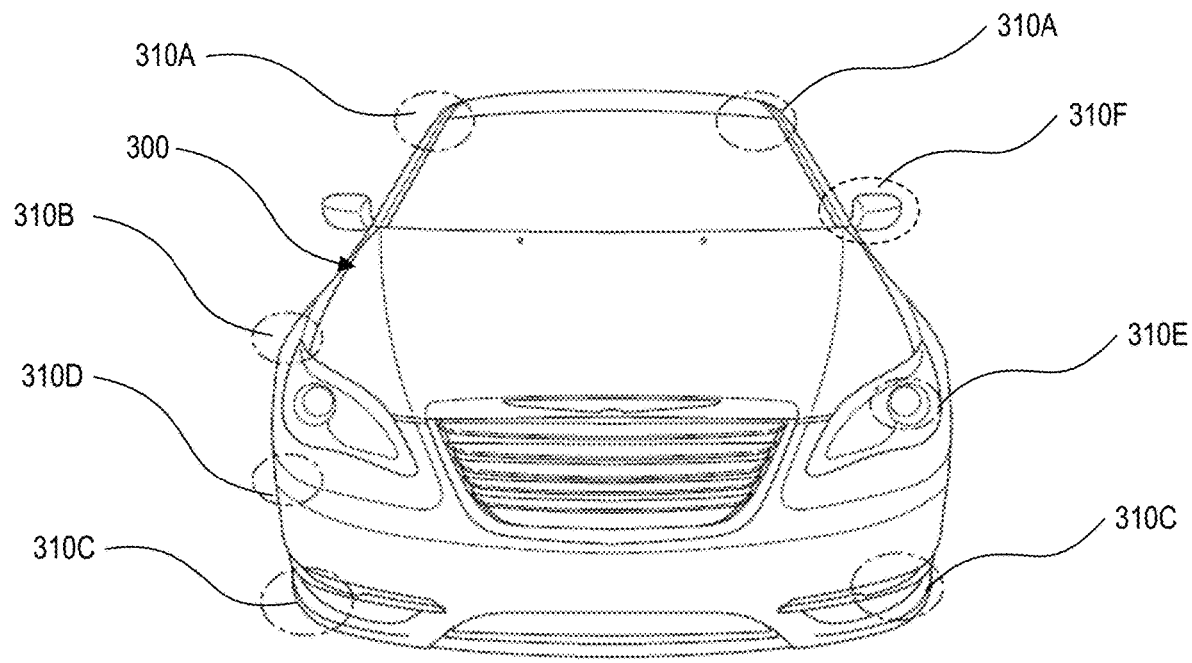
Figure 4A:
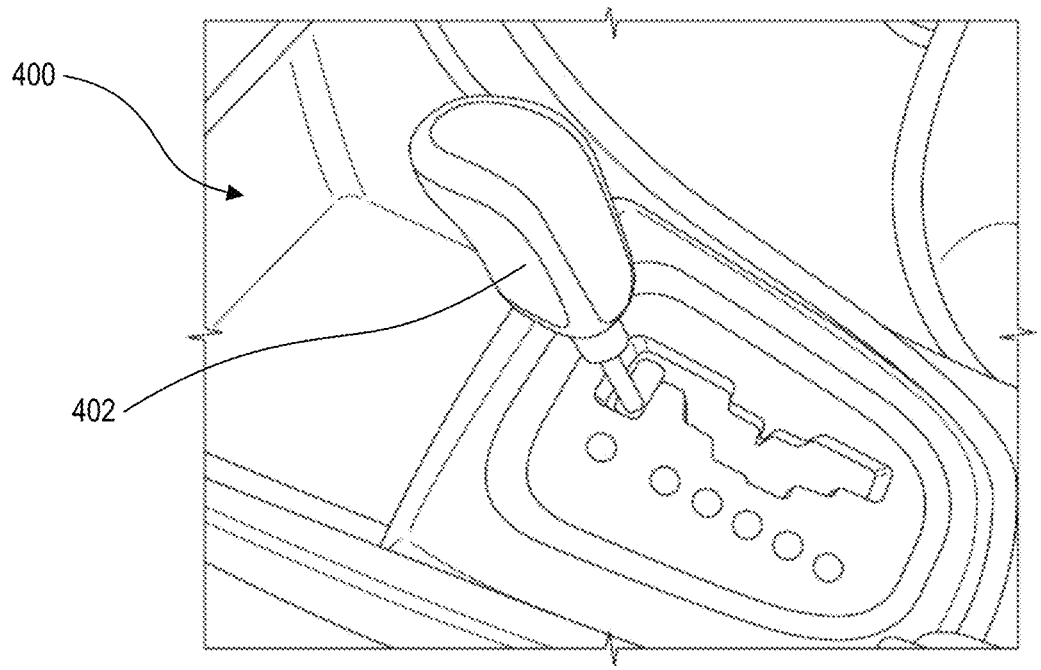
FIGS. 4A and 4B depict an exemplary interior vehicle image with anchor points in accordance with one or more illustrative aspects discussed herein.
Figure 4B:
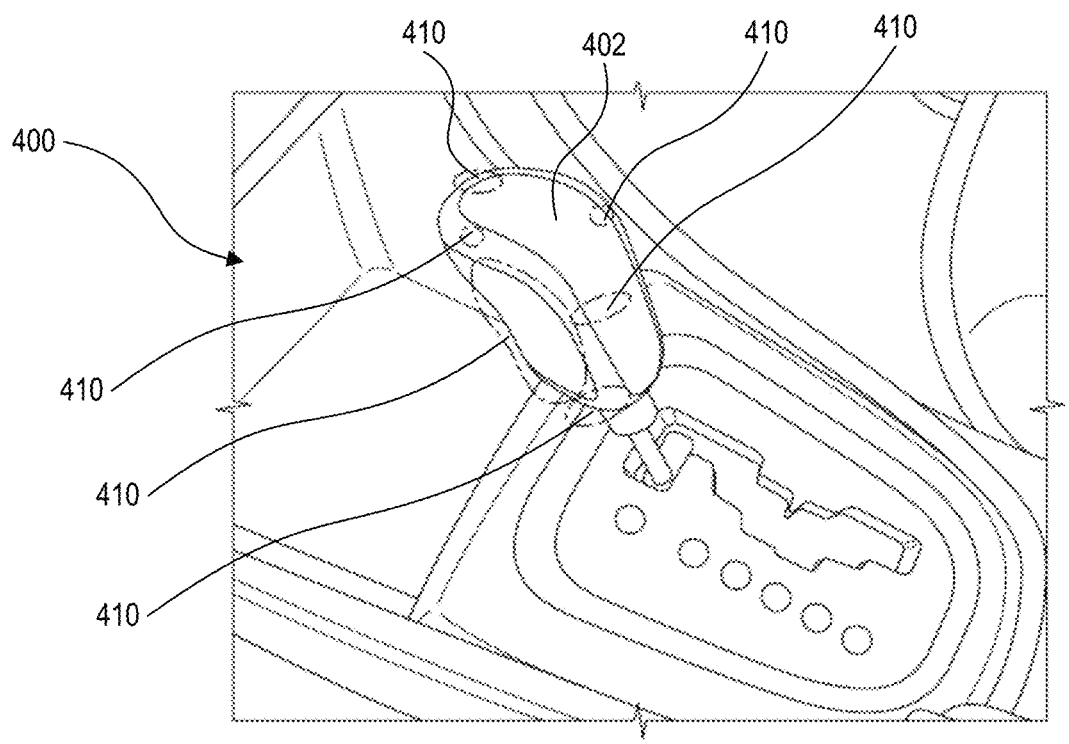

Specifically, the machine learning model 129 may be utilized for image processing and/or component identification with the vehicle application 127. The machine learning model 129 may receive images of the vehicle and analyze those images of the vehicle. The machine learning model 129 may analyze the images of the vehicle to determine and identify what angle the images are from. The machine learning model 129 may match the images to an actual angle of the vehicle from the three-dimensional model. For example, the machine learning model 129 may identify images of a front of the vehicle, a mid-section of the vehicle, or a rear of the vehicle and from what angle those images are taken from. FIGS. 3A, 3B, 4A, and 4B illustrate exemplary images of a vehicle. Specifically, FIGS. 3A and 3B illustrate an exemplary exterior vehicle image 300 and FIGS. 4A and 4B illustrate an exemplary interior vehicle image 400. The exemplary exterior vehicle image 300 illustrates a front top view of the front of the vehicle. The exemplary interior vehicle image 400 illustrates a perspective view of a shift stick 402 in the driver console of the interior of the vehicle. The machine learning model 129 may identify a plurality of anchor points from the images 300, 400 based on various corners, edges, and/or areas from the three-dimensional model. The machine learning model 129 may identify the anchor points programmatically throughout the interior and the exterior of the vehicle.

FIGS. 3B and 4B illustrate the exterior vehicle image 300 and the interior vehicle image 400 with potential anchor points 310, 410 identified. As illustrated in FIG. 3B, the exterior vehicle image 300 may include various potential anchor points 310, such as, for example, roof corners 310A, hood corners 310B, fender corners 310C, bumper corners 310D, headlights 310E, side-view mirrors 310F, etc. As illustrated in FIG. 4B, the interior vehicle image 400 may include various potential anchor points 410 on the stick shift 402. Other locations may be identified and used as anchor points 310, 410.

The machine learning model 129 may identify anchor points 310, 410 utilizing various methods. The plurality of anchor points 310, 410 on the images may correlate to the corners, edges, areas, and/or points on various internal components and external components on the three-dimensional model and the vehicle. For example, the machine learning model 129, through the vehicle application 127 and/or the vehicle dealership server 101, may identify the anchor points 310, 410 as defined by a set of corners and/or edges from the three-dimensional model of the vehicle and the plurality of images. Additionally, the machine learning model 129, through the vehicle application 127 and/or the vehicle dealership server 101, may identify the anchor points 310, 410 as defined by a set of points on the three-dimensional model of the vehicle and the plurality of images where an X/Y grid difference for the set of points is greater than a threshold amount.

Figure 5A:
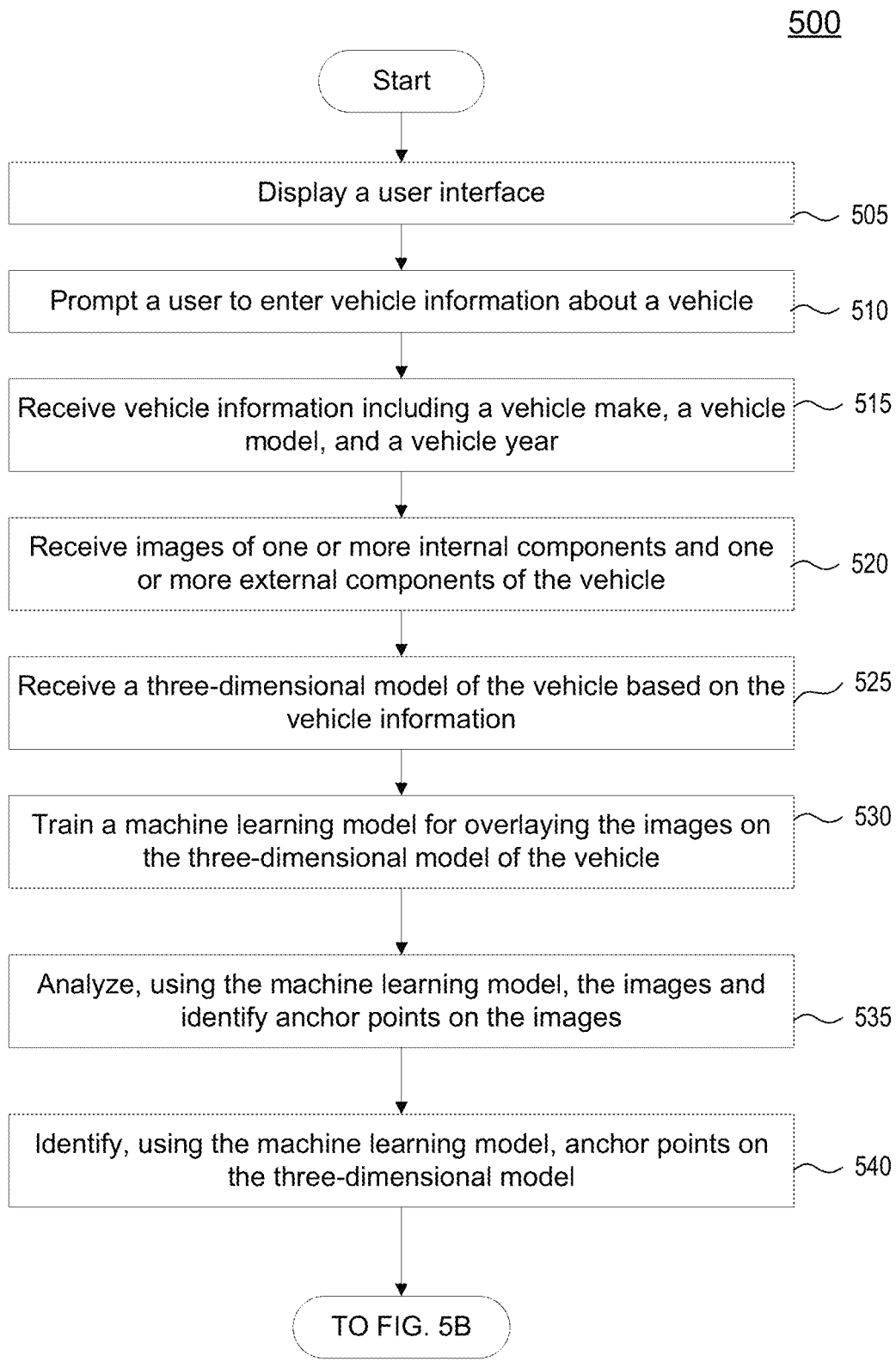
FIGS. 5A and 5B depict a flow chart for determining the resale value of a vehicle based on the components within the vehicle according to one or more aspects of the disclosure.
Figure 5B:
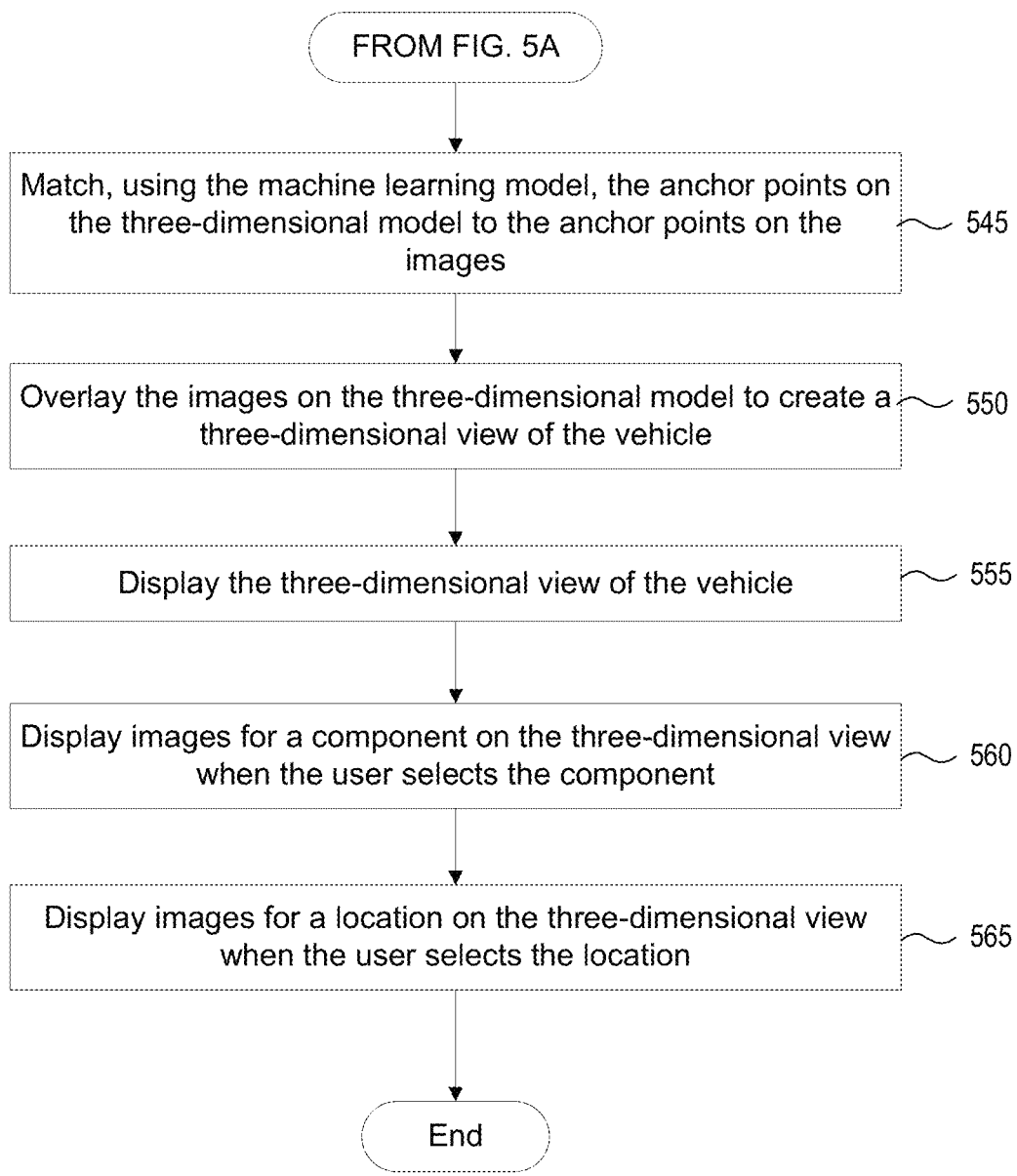

FIGS. 5A and 5B illustrate an example method 500 for image analysis and, more specifically, overlaying images onto a three-dimensional model of a vehicle. Further, the method 500 may provide a method of providing three-dimensional viewing of images from a two-dimensional image while viewing a vehicle. Method 500 may be implemented by a suitable computing system, as described further herein. For example, method 500 may be implemented by any suitable computing environment, by a computing device, and/or a combination of computing devices, such as the vehicle dealership server 101 and/or devices 105, 107, and 109 of FIG. 1. In a variety of embodiments, some or all of the steps described below may be combined and/or divided into sub-steps as appropriate. It will be readily appreciated that other steps may be included in this method, and that not all steps are necessary in all situations.

Specifically, FIGS. 5A and 5B illustrate an example method 500 for determining a resale value of a vehicle and/or vehicle components. At step 505, a computing device, or an application (e.g., the vehicle application 127 and/or the vehicle dealership server 101) executing on the computing device, may display on a display of the computing device, a user interface. The vehicle application 127 may be accessed through various different mechanisms, such as operating on the vehicle dealership server 101 and/or one or more of the devices 105, 107, 109, or via a browser extension or website application on the Internet operating on the vehicle dealership server 101 and/or one or more of the devices 105, 107, 109. A computing device or an application may receive the vehicle information from the user via the user interface on the device 105 executing on the vehicle application 127. The vehicle information may include one or more of: a vehicle make, a vehicle model, and/or a vehicle year.

During step 510, a computing device or the vehicle application 127 may prompt via the user interface, the user to input the vehicle information about a vehicle. Additionally, during step 515, the vehicle application 127 and/or the vehicle dealership server 101 may receive the vehicle information which may include a vehicle make, a vehicle model, and/or a vehicle year.

At step 520, the vehicle application 127 and/or the vehicle dealership server 101 may receive images of one or more internal components and/or one or more external components of the vehicle. The vehicle application 127 and/or the vehicle dealership server 101 may cause, responsive to a user selection on the user interface, a camera to capture one or more of the images and/or videos of the vehicle to include the internal components and/or the external components of the vehicle. The camera 106 may capture the images and/or videos of the vehicle responsive to a user selection on the user interface. The vehicle application 127 and/or the vehicle dealership server 101 via the user interface may direct or request the user to capture images and/or videos of the vehicle, and specifically various internal and/or external components of the vehicle. The vehicle application 127 and/or the vehicle dealership server 101 via the user interface may direct or request the user to capture various angles of the vehicle, various angles of the vehicle components, or specific images and/or videos of specific components of the vehicle. The camera 106 may store the images and/or videos of the vehicle and/or the plurality of vehicle components. The camera 106 may send and transfer the images and/or videos of the vehicle and/or the plurality of vehicle components to the vehicle application 127 and/or the vehicle dealership server 101. Additionally, the vehicle application 127 and/or the vehicle dealership server 101 may prompt, via the user interface using the camera 106, the user to capture additional images or videos of one or more of the internal and/or external components based on a request for additional and/or missing information. The user may take various images of the vehicle with various angles. The user may take various videos of the vehicle also. The user may utilize the user interface of the vehicle application 127 and/or the vehicle dealership server 101 to take videos and/or images of the vehicle. The vehicle application 127 and/or the vehicle dealership server 101 may parse the videos into specific images of the vehicle and/or the vehicle components.

At step 525, the vehicle application 127 and/or the vehicle dealership server 101 may receive a three-dimensional model of the vehicle based on the vehicle information. The three-dimensional model may comprise one or more internal components of the vehicle and/or one or more external components of the vehicle. A vehicle API 210 connected to one or more vehicle websites 212 may provide the three-dimensional models of vehicles for the vehicle application 127.

At step 530, the vehicle application 127 and/or the vehicle dealership server 101 may train a machine learning model 129 for overlaying the images on the three-dimensional model of the vehicle based on the images and the vehicle information. The machine learning model 129 may be a machine classifier, an image classifier, or a machine learning algorithm as described herein.

At step 535, the vehicle application 127 and/or the vehicle dealership server 101 may analyze and classify the images and/or videos using the machine learning model 129 to identify anchor points on the images. The machine learning model 129 may identify one or more internal components and/or one or more external components of the vehicle based on the images or videos of the vehicle and/or vehicle components. First, the machine learning model 129 may analyze and classify the images of the vehicle to determine and identify the angle of the image. The machine learning model 129 may be trained to match the images to an actual angle of the vehicle from the three-dimensional model. For example, the machine learning model 129 may identify images of a front of the vehicle, a mid-section of the vehicle, or a rear of the vehicle and from what angle those images are taken from. The machine learning model 129 may be trained to recognize and identify a plurality of anchor points on the images by classifying and identifying certain edges, areas, or points on the vehicle and the components of the vehicle. The plurality of anchor points on the images may correlate to the edges, areas, and points on various internal components and external components on the three-dimensional model of the vehicle. The machine learning model 129 may programmatically identify the anchor points throughout the vehicle. The machine learning model 129 may identify anchor points utilizing various methods. For example, the machine learning model 129, through the vehicle application 127 and/or the vehicle dealership server 101, may identify the anchor points as defined by a set of corners and/or edges on various components of the vehicle from the plurality of images. Additionally, the machine learning model 129, through the vehicle application 127 and/or the vehicle dealership server 101, may identify the anchor points as defined by a set of points on the plurality of images where an X/Y grid difference for the set of points is greater than a threshold amount.

At step 540, the machine learning model 129, through the vehicle application 127 and/or the vehicle dealership server 101, may identify a plurality of anchor points on the three-dimensional model. The plurality of anchor points on the three-dimensional model may correlate to the one or more internal components and the one or more external components on the three-dimensional model. The plurality of anchor points may be defined by a set of corners and/or a set of edges from the three-dimensional model of the vehicle. The plurality of anchor points may also be defined by a set of points on the three-dimensional model of the vehicle where an X/Y grid difference for the set of points is greater than a threshold amount.

At step 545, the machine learning model 129, through the vehicle application 127 and/or the vehicle dealership server 101, may match the anchor points on the three-dimensional model to the anchor points on the images.

At step 550, the machine learning model 129, through the vehicle application 127 and/or the vehicle dealership server 101, may overlay the plurality of images on the three-dimensional model to create a three-dimensional view of the vehicle. The machine learning model 129 may be configured to determine a pattern of the anchor points on the three-dimensional model of the vehicle associated with the anchor points on the images that indicates a potential correlation between the anchor points on the three-dimensional model and the anchor points on the images. The overlaying of the images on the three-dimensional model of the vehicle may create a mesh of the images on the three-dimensional model to create the three-dimensional view of the vehicle.

At step 555, the vehicle application 127 and/or the vehicle dealership server 101 may display the three-dimensional view of the vehicle. The three-dimensional view of the vehicle may be displayed via the user interface to the consumer.

At step 560, the vehicle application 127 and/or the vehicle dealership server 101 may display actual current images for a component on the three-dimensional view when the user selects the component. Additionally, at step 565, the vehicle application 127 and/or the vehicle dealership server 101 may display the actual current images for a specific location on the three-dimensional view when the user selects the location.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
   a display with a user interface;
   one or more processors; and
   memory storing instructions that, when executed by the one or more processors, cause the computing device to:
   receive, via the user interface and from a user, vehicle information that includes at least one of: a vehicle make, a vehicle model, or a vehicle year;
   receive a plurality of images comprising:
   images of one or more internal components of the vehicle, and
   images of one or more external components of the vehicle;
   receive, based on the vehicle information, a three-dimensional model of the vehicle, wherein the three-dimensional model comprises three-dimensional representations of the one or more internal components of the vehicle and the one or more external components of the vehicle;
   provide, as input to a trained machine learning model, the plurality of images;
   receive, in response to the input and from the trained machine learning model, output comprising a grid difference between a first plurality of anchor points corresponding to the three-dimensional model of the vehicle and a second plurality of anchor points on the plurality of images;
   overlay, based on the grid difference, the plurality of images on the three-dimensional model to create a three-dimensional view of the vehicle; and
   display, via the user interface, the three-dimensional view of the vehicle.

2. The computing device of claim 1, wherein the trained machine learning model comprises a convolutional neural network (CNN) model.

3. The computing device of claim 1, wherein the instructions, when executed by the one or more processors, cause the computing device to:
   cause, responsive to a user selection on the user interface, a camera to capture the plurality of images.

4. The computing device of claim 3, wherein the instructions, when executed by the one or more processors, cause the computing device to prompt, via the user interface, the user to capture, using the camera, additional images of the vehicle based on a request for missing information.

5. The computing device of claim 1, wherein when the user selects a component on the three-dimensional view of the vehicle, and wherein the instructions, when executed by the one or more processors, cause the computing device to:
display, via the user interface, one or more of the plurality of images for the component on the vehicle.

6. The computing device of claim 1, wherein the instructions, when executed by the one or more processors, cause the computing device to:
receive, via the user interface, a selection of a location on the three-dimensional view of the vehicle; and
display, via the user interface, one or more of the plurality of images for the location on the vehicle.

7. The computing device of claim 1, wherein the plurality of images comprises images at different angles of the one or more internal components of the vehicle and the one or more external components of the vehicle.

8. The computing device of claim 1, wherein the first plurality of anchor points comprises a set of corners and a set of edges from the three-dimensional model of the vehicle and the plurality of images.

9. The computing device of claim 1, wherein the first plurality of anchor points is defined as a set of points on the three-dimensional model of the vehicle.

10. The computing device of claim 1, wherein the instructions, when executed by the one or more processors, cause the computing device to overlay the plurality of images on the three-dimensional model of the vehicle to create a mesh of the plurality of images.

11. The computing device of claim 1, wherein the first plurality of anchor points on the three-dimensional model comprise one or more anchor points indicating a geometry of the one or more internal components of the vehicle.

12. A computer-implemented method comprising:
displaying, on a display of a computing device with one or more processors, a user interface;
prompting, via the user interface, a user to enter vehicle information;
receiving, via the user interface and from the user, the vehicle information about a vehicle that includes at least one of: a vehicle make, a vehicle model, or a vehicle year;
receiving a plurality of images comprising:
images of one or more internal components of the vehicle, and
images of one or more external components of the vehicle;
receiving, by the one or more processors and based on the vehicle information, a three-dimensional model of the vehicle, wherein the three-dimensional model comprises three-dimensional representations of the one or more internal components of the vehicle and the one or more external components of the vehicle;
providing, as input to a trained convolutional neural network (CNN) model, the plurality of images;
receiving, in response to the input and from the trained CNN model, output comprising a grid difference between a first plurality of anchor points corresponding to the three-dimensional model of the vehicle and a second plurality of anchor points on the plurality of images, wherein the first plurality of anchor points on the three-dimensional model correlate to the one or more internal components and the one or more external components of the three-dimensional model and the second plurality of anchor points on the plurality of images correlate to the one or more internal components and the one or more external components of the plurality of images;
overlaying, by the one or more processors and based on the grid difference, the plurality of images on the three-dimensional model to create a three-dimensional view of the vehicle; and
displaying, via the user interface, the three-dimensional view of the vehicle.

13. The method of claim 12, further comprising:
receiving, via the user interface, a selection of a component on the three-dimensional view of the vehicle; and
displaying, via the user interface, one or more of the plurality of images depicting the component.

14. The method of claim 12, further comprising:
receiving, via the user interface, a selection of a location on the three-dimensional view of the vehicle; and
displaying, via the user interface, one or more of the plurality of images depicting the location.

15. The method of claim 12, wherein the first plurality of anchor points comprises one or more of a set of corners and a set of edges from the three-dimensional model of the vehicle.

16. The method of claim 12, wherein overlaying the plurality of images on the three-dimensional model of the vehicle comprises creating a mesh of the plurality of images.

17. The method of claim 12, further comprising:
receiving, via a camera, the plurality of images; and
prompting, via the user interface, the user to capture additional images, using the camera, of the vehicle based on a request for missing information.

18. One or more non-transitory media storing instructions that, when executed by one or more processors, cause a computing device to perform steps comprising:
displaying, on a display of the computing device, a user interface;
prompting, via the user interface, a user to enter vehicle information about a vehicle;
receiving, via the user interface, the vehicle information including: a vehicle make, a vehicle model, and a vehicle year;
receiving a plurality of images comprising:
images of one or more internal components of the vehicle, and
images of one or more external components of the vehicle;
receiving, by the one or more processors and based on the vehicle information, a three-dimensional model of the vehicle, wherein the three-dimensional model comprises three-dimensional representations of the one or more internal components of the vehicle and the one or more external components of the vehicle;
providing, as input to a trained convolutional neural network (CNN) model, the plurality of images;
receiving, in response to the input and from the trained CNN model, output comprising a grid difference between a first plurality of anchor points corresponding to the three-dimensional model of the vehicle and a second plurality of anchor points on the plurality of images, wherein the first plurality of anchor points on the three-dimensional model correlate to the one or more internal components and the one or more external components of the three-dimensional model, and wherein the first plurality of anchor points on the three-dimensional model indicate a set of corners and a set of edges from the three-dimensional model of the vehicle;

overlaying, by the one or more processors and based on the grid difference, the plurality of images on the three-dimensional model to create a three-dimensional view of the vehicle;

displaying, via the user interface, the three-dimensional view of the vehicle;

when the user selects a component on the three-dimensional view of the vehicle, displaying, via the user interface, one or more of the plurality of images for the component on the vehicle; and when the user selects a location on the three-dimensional view of the vehicle, displaying, via the user interface, one or more of the plurality of images for the location on the vehicle.

19. The one or more non-transitory media storing instructions of claim 18, wherein the instructions, when executed by the one or more processors, cause the overlaying the plurality of images on the three-dimensional model of the vehicle by causing creation of a mesh of the plurality of images.

20. The one or more non-transitory media storing instructions of claim 18, wherein the instructions, when executed by the one or more processors, further cause the computing device to perform steps comprising:

receiving, via a camera, the plurality of images; and prompting, via the user interface, the user to capture additional images, using the camera, of the vehicle based on a request for missing information.

* * * * *